US005147162A

United States Patent [19]

Capotosto et al.

[11] Patent Number: 5,147,162

[45] Date of Patent: Sep. 15, 1992

[54] SELF-GUIDABLE DRILL HOUSING

[76] Inventors: Rosario Capotosto; Michael Capotosto, both of 9 Griggs Dr., Greenlawn, N.Y. 11740

[21] Appl. No.: 837,885

[22] Filed: Feb. 20, 1992

[51] Int. Cl.[5] .............................................. B23B 45/14

[52] U.S. Cl. ............................... 408/110; 408/241 G; 408/712

[58] Field of Search ................. 408/99, 100, 110, 112, 408/241 G, 712

[56] References Cited

U.S. PATENT DOCUMENTS

| | | | |
|---|---|---|---|
| 3,141,360 | 7/1964 | Wolf | 408/110 |
| 3,874,810 | 4/1975 | Russell | 408/110 |
| 4,080,092 | 3/1978 | Hudson | 408/110 |
| 4,810,137 | 3/1989 | Yang | 408/712 |
| 5,006,022 | 4/1991 | Miller | 408/712 |

*Primary Examiner*—Daniel W. Howell

[57] ABSTRACT

A self-guidable portable electric drill having as an integral appendage of the motor housing a V-grooved channel which is instrumental in guiding the drill on an axis perpendicular to the work surface when the trough of the V-groove is butted against, and slidably moved downwardly along the blade of the common try or combination square standing perpendicularly on the work surface.

1 Claim, 3 Drawing Sheets

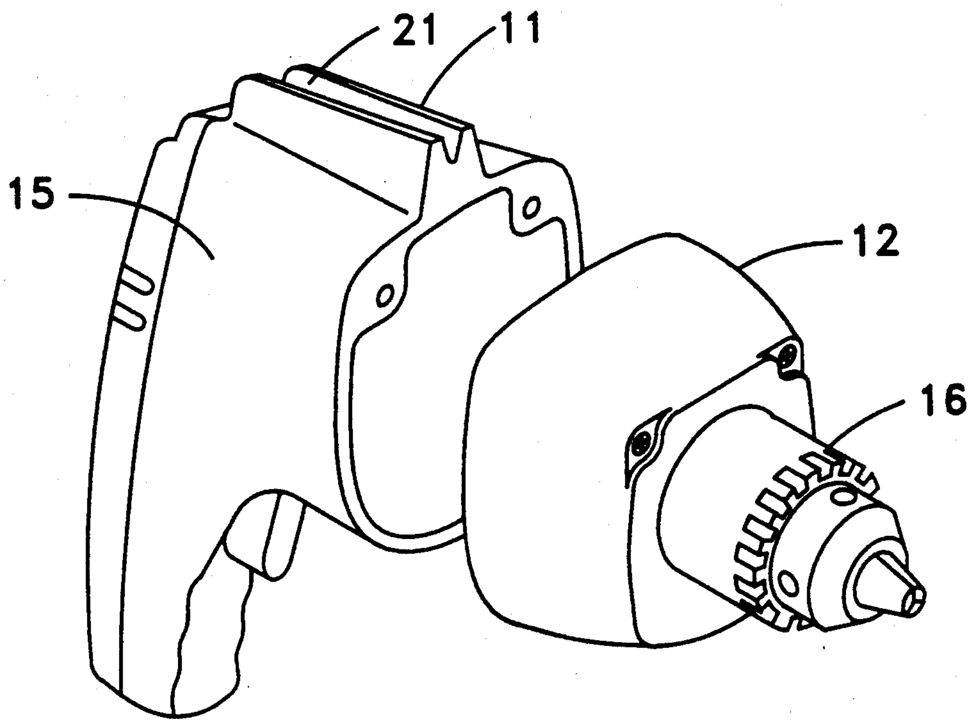
Fig. 6
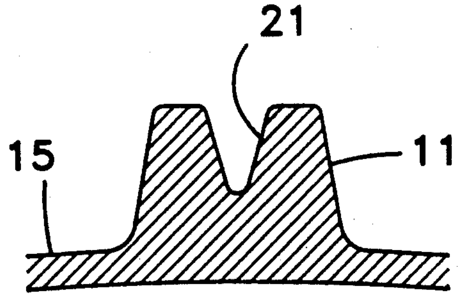
Fig. 7
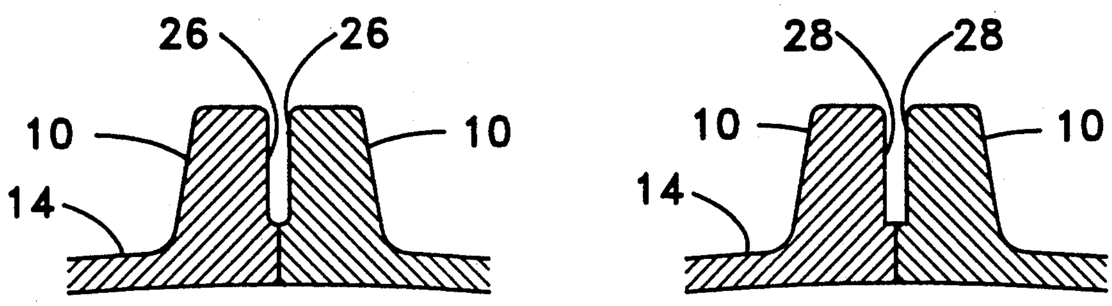
Fig. 8
Fig. 9

SELF-GUIDABLE DRILL HOUSING

FIELD OF THE INVENTION

This invention relates to a portable electric drill housing so shaped as to be instrumental in guiding the drill. More specifically, the invention enables the user to accurately bore holes perpendicular to the work surface.

BACKGROUND OF THE INVENTION

This invention arose as a result of attempts to improve upon conventional hand guiding techniques in the use of portable electric drills in industry, commercial construction and fabrication as well as "do-it-yourself" home projects and home workshop operations. Skilled craftsmen as well as amateurs often have a need to bore accurately perpendicular holes in a workpiece. It is well known in the art that holes cannot be bored with any appreciable degree of perpendicular precision With a hand supported power drill because of the inherent human error in maintaining the drill in a true perpendicular relationship with the workpiece While various drilling guides are on the market, they do not, to my knowledge, utilize the drill housing itself as a means to guide the drill as set out herein. Several devices such as the portalign Drill Guide, U.S. Pat. No. 3,874,810, and the Precision Drill Guide, Pat. Applied For, are effective for their dedicated purposes but do share draw-backs in common including inconvenience involved in preparing the drill guide for use as well as comparatively high cost of the product.

Both these devices necessitate removal of the chuck from the drill to allow reassembly on the drill guide's shaft. The drill is then threaded to the end of the drill guide's spindle. These temporary switch-overs take time, thus often discouraging utilization, particularly for minor drilling operations. Optionally, an auxiliary chuck and adapter may be permanently installed on the guide to avoid the need for removal from the drill. This adds more to the cost.

Less sophisticated drill guides, also on the market, utilize short bushings which are meant to support the drill perpendicularly. Accuracy of the drilled holes is not assured with such bushing type guides inasmuch as guidance relies upon the thrust of the side of the drill bit against the comparatively small wall of the bushing. Thus, lacking ample flanking support of the bulk of the tool in the area away from the bushing, the hand holding and driving the drill is prone to sway or drift off the intended true perpendicular axis The result is a non-perpendicular drilled hole. Also, the top of the bushing or its holder acts as an inadvertent stop against the drill chuck thus limiting the travel of the drill bit. This appreciably limits the depth of hole that could otherwise be achieved.

SUMMARY OF THE INVENTION

The principal object of the present invention is to provide a portable electric drill so constructed, particularly with reference to the motor housing, with a built-in guidance facility so as to enable the user to readily bore holes perpendicular to a work surface when such drill is used in conjunction with a common carpenter's try or combination square.

It is also an object of the present invention to provide such a drill motor housing component which is of simple construction, inexpensive to manufacture and having ease of operation.

The foregoing objects can be accomplished with a unique motor housing component that can be incorporated as the basic structural enveloping member of a conventional portable electric drill. Such a motor housing having as an integral feature an appendage of unique configuration comprising a V shaped grooved channel running longitudinally along the back of the motor housing. The baseline of the channel stands slightly proud of the surrounding area of the motor housing and extends on an axis that is parallel to the rotational axis of the drill, and accordingly, the drill bit.

With a drill and chucked drill bit positioned on the work and with the drill bit tip resting at the desired point of entry, a square is positioned alongside, with the broad face of its handle resting on the work surface and the blade perpendicular. The square is moved so as to engage the lead edge of its blade snug against the trough of the V-grooved channel on the drill motor housing. The square is held firmly in place. With the channel on the drill motor housing kept continually in contact with the blade of the square, the drill is activated and pushed downwardly to advance the drill bit into the work. The perpendicular attitude of the blade of the square guides the drill and bit on a true perpendicular course. Unobstructed in its travel along the blade of the square, the drill allows the full capacity of the drill bit to be utilized in boring holes.

These objects will be evident upon a reading of the following specifications with reference to the accompanying drawings wherein the preferred embodiments of the present invention are shown. It is to be understood that these embodiments are merely exemplary and are not intended to exhaust the physical configurations available according to the teachings herein.

BRIEF DESCRIPTION OF THE DRAWINGS

FIG. 6 is a partially exploded perspective view of a second embodiment of the invention adapted to non-divided seamless back type motor housing;

FIG. 7 is a fragmentary cross section of the unitary V-grooved channel shown in FIG. 6;

FIGS. 8 and 9 are fragmentary cross section view of alternate configurations of the embodiment of the invention.

DESCRIPTION OF THE PREFERRED EMBODIMENTS

Figure 3:
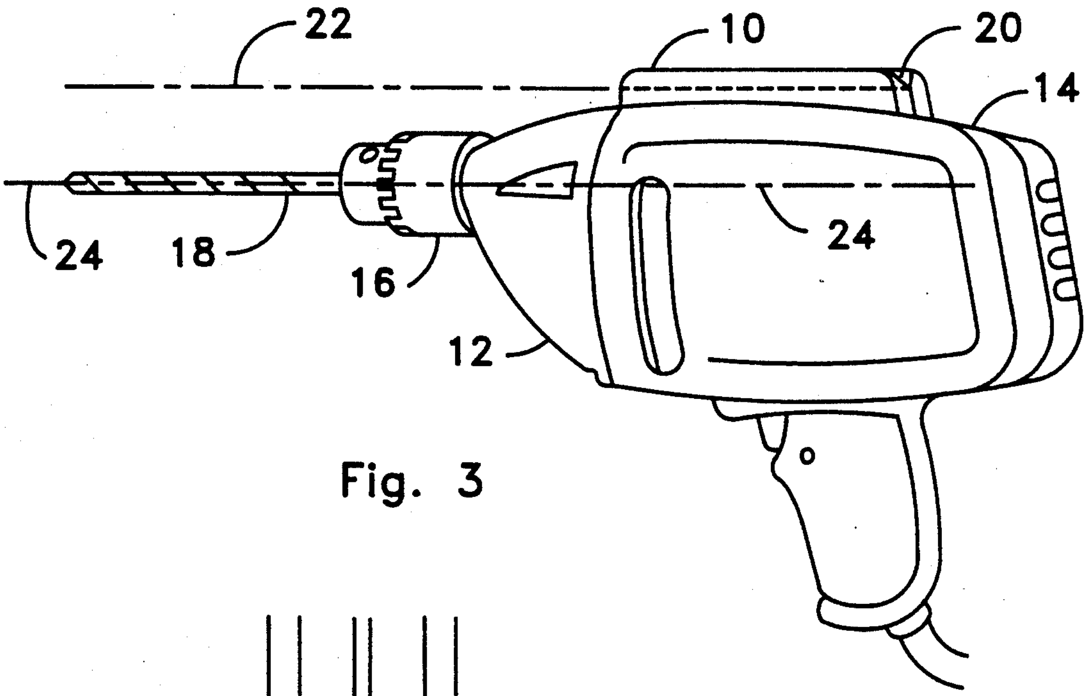
FIG. 3 is a perspective view of the self-guidable portable drill with a drill bit secured in the chuck.

Referring now to FIG. 3 which is an overall drawing of the preferred embodiment of the invention, there is shown a novel self-guidable integral appendage 10 on the motor housing 14 of a portable electric drill 12 which includes a chuck 16 which holds a drill bit 18. In this specification the area of the motor housing 14 opposite the handle is regarded as the back of the drill 12. The appendage 10 runs longitudinally along the back of the motor housing 14 and has a V-grooved channel 20 comprised of diametrically opposed chamfered faces extending the full length of the appendage 10. The baseline of the V-grooved channel 20 extends on an axis 22 which is parallel to the rotational axis 24 of the chuck 16 and the drill bit 18.

Figure 4:
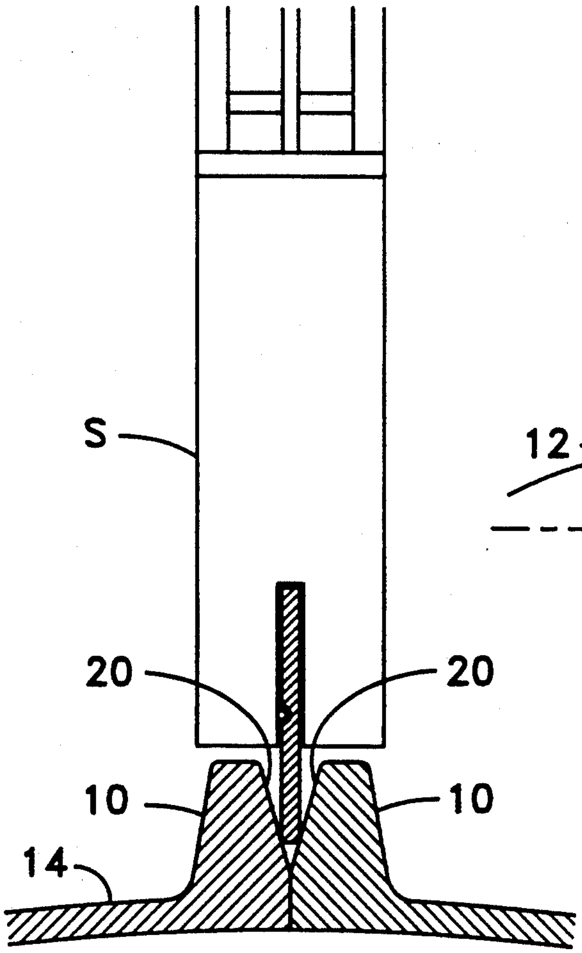
FIG. 4 is a fragmentary sectional view of the first embodiment of the invention in proximity with a guiding square which is shown in end view.

Referring to FIG. 4, according to my invention, the V-grooved channel 20 is formed at the interface of the abutted chamfered appendages 10 which are integrally molded components on the rims of the molded longitudinally bi-sectioned halves of the motor housing 14.

Figure 5:
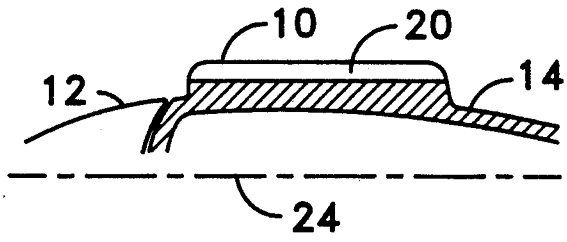
FIG. 5 is a fragmentary side view of a half-section portion of the drill guide channel as featured on a bi-sectional drill motor housing shown in the first embodiment, FIG. 3.

Referring to FIG. 5, it may be seen in the appendage 10 portion of the half-section of the motor housing 14, that the baseline of the chamfered face of the appendage 10 is oriented to extend on an axis parallel to the rotational axis 24 of the drill 12 notwithstanding the longitudinal irregular contour of the surrounding area of the back of the motor housing 14. The baseline of the chamfered face of the appendage 10 stands slightly proud of the adjacent surface of the motor housing 14.

The second embodiment, which is shown in FIGS. 6 and 7, relates to an adaptation of the invention to another type drill motor housing which is characterized by a non-divided continuous back section which is devoid of a longitudinal seam. The self-guidable appendage 11 comprises a unitary monolithically folded outcropping of the motor housing 15. This second form of the invention embodies the same parallel axial relationship between the base of the V-grooved channel 21 and the rotational axis of the drill 12 as prevails in the first embodiment and operates in precisely the same manner.

FIGS. 8 and 9 illustrate alternate cross section configurations of the appendage 10 including a U shaped channel 26, FIG. 8, and a rectangular shaped channel 28, FIG. 9.

Figure 1:
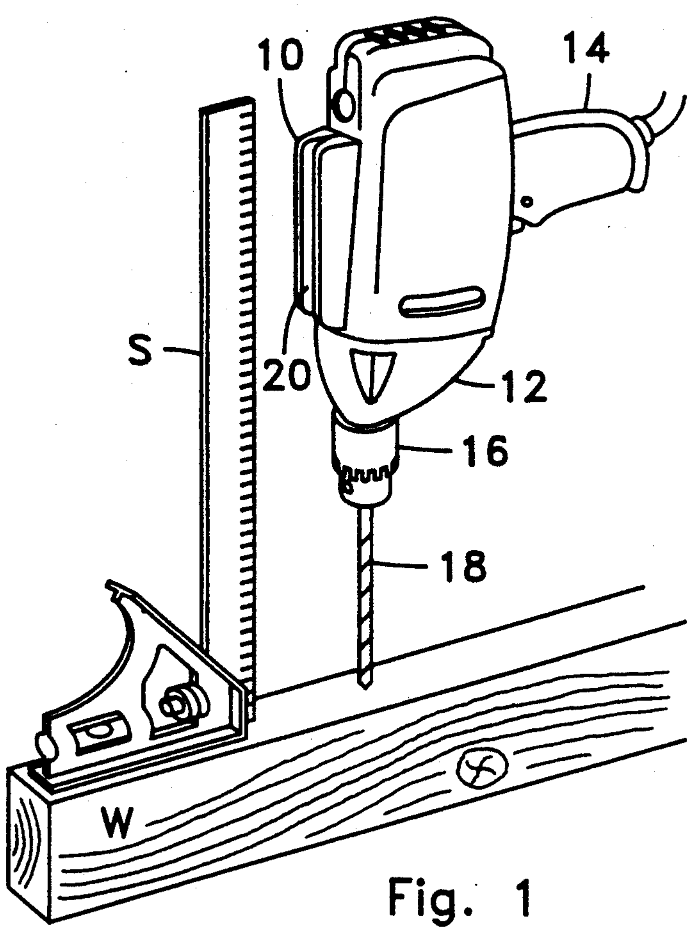
FIG. 1 is a perspective view of a portable electric drill featuring a novel motor housing constructed in accordance with the teachings of the present invention, as applied to a work surface in conjunction with a square.
Figure 2:
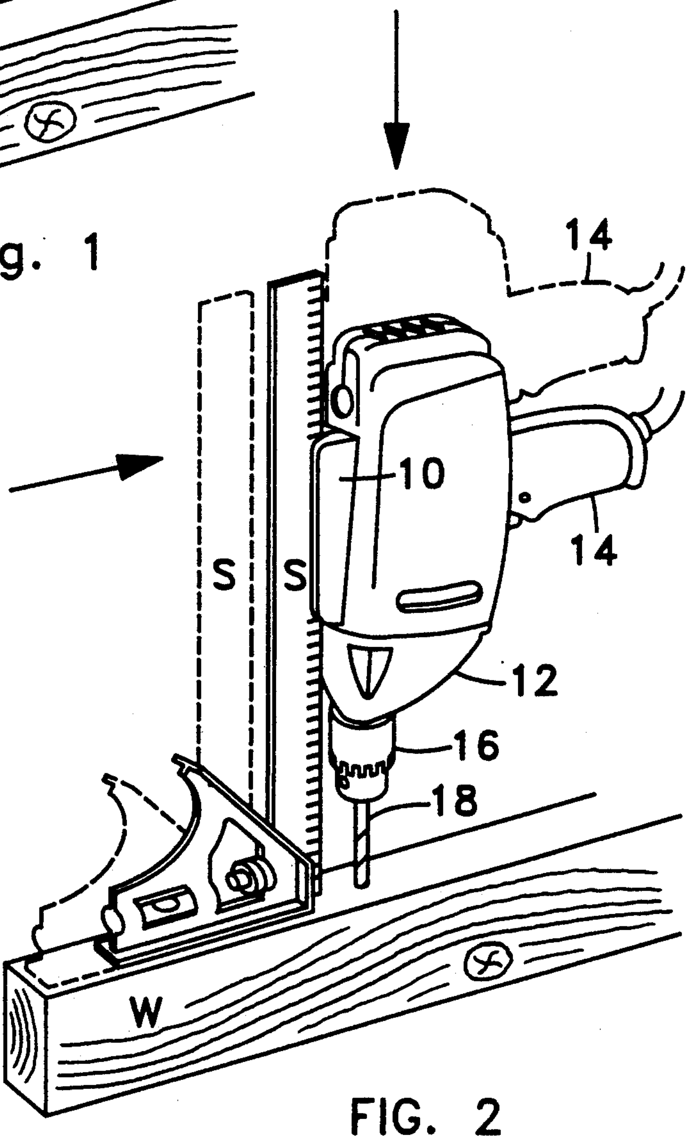
FIG. 2 is a perspective view of the drill in the operative mode for boring a hole perpendicular to the work surface, the broken lines indicating the previous positions of the square and drill.

FIGS. 1 and 2 illustrate the drill 12 featuring the self-guidable drill motor housing 14 appendage 10 in the operational mode for boring a perpendicular hole in a workpiece W in conjunction with the use of a try or combination square S. The drill 12 with a chucked drill bit 18 is positioned on the workpiece W surface with the tip of the bit 18 located at the desired point of entry. The square S is positioned in close proximity, with the broad base of the handle resting on the workpiece W surface with the blade being perpendicular. The square S is moved so as to engage the leading edge of the blade butted firmly in contact with the trough of the V-grooved channel 20 of the self-guidable appendage 10 on the motor housing 14. The square S is held firmly in place on the surface of the workpiece W. The drill 12 is energized, and while it is held firmly against the blade of the square S, as can be seen in FIG. 4, it is slidably moved downward to advance the drill bit 18 into the workpiece W. The perpendicular attitude of the blade of the square S relative to the workpiece W surface guides the drill 12 and, accordingly, the drill bit 18 on a true course perpendicular to the surface of the workpiece W. Unobstructed in its travel along the blade of the square S, the full capacity of the drill bit 18 may be utilized.

From the foregoing it will be apparent that the present invention provides a new and novel means for perpendicularly guiding a portable electric drill; and said invention which is of simple construction can be economically incorporated in the manufacturing process of said drill motor housing components.

While specific embodiments have been set forth above it will be apparent that many modifications may be made therein without departing from the spirit of the invention.

Having thus described my invention, we claim:

1. A self-guidable motor housing component for a portable electric drill, having a built-in capability to facilitate alignment of the rotational axis of the drill perpendicular to a work surface, comprising an integral appendage on each section of a typical longitudinally bi-sectioned drill motor housing, each said appendage located along the rims of said motor housing sections in the area opposite the handle and extending longitudinally, each face of said appendages chamfered in diametrically opposed directions from a baseline extending lengthwise on an axis parallel to the rotational axis of said drill, said baseline stands slightly above the adjacent surface of said motor housing, said faces of diametrically opposed chamfers forming a longitudinal V-grooved channel having said baseline at the interface of said appendages of joined sections of said drill motor housing, said V-grooved channel extends on an axis parallel to the said rotational axis of said drill, said V-grooved channel may be butted firmly against the leading edge of a perpendicularly standing blade of a try or combination square held on the work surface allowing said drill to slidably move downward on an axis perpendicular to said work surface whereby a drill bit chucked in said drill will enter said work surface perpendicularly and accordingly bore a hole perpendicular to said work surface.

* * * * *